United States Patent [19]

Abe et al.

[11] Patent Number: 5,590,040

[45] Date of Patent: Dec. 31, 1996

[54] SELF-DIAGNOSIS APPARATUS FOR VEHICLE

[75] Inventors: Takahide Abe, Kariya; Katsumi Takaba, Obu, both of Japan

[73] Assignee: Nippondenso Co., Ltd., Kariya, Japan

[21] Appl. No.: 107,154

[22] Filed: Aug. 17, 1993

[30] Foreign Application Priority Data

Aug. 19, 1992 [JP] Japan .................................. 4-242804

[51] Int. Cl.⁶ ........................... G06F 17/00; G01M 15/00
[52] U.S. Cl. ............................. 364/424.04; 364/424.034; 340/438; 340/439; 73/117.3
[58] Field of Search ......................... 364/424.04, 424.03, 364/550, 551.01; 340/438, 439, 459, 635; 73/117.3; 377/13, 15, 16

[56] References Cited

U.S. PATENT DOCUMENTS

| | | | |
|---|---|---|---|
| 3,781,824 | 12/1973 | Caiati et al. | 377/16 |
| 4,258,421 | 3/1981 | Juhasz et al. | 364/424.04 |
| 4,395,624 | 7/1983 | Wartski | 377/15 |
| 4,817,040 | 3/1989 | Bodley-Scott | 364/424.04 |
| 4,817,118 | 3/1989 | Wilburn et al. | 364/424.04 |
| 4,924,391 | 5/1990 | Hirano et al. | 364/551.01 |
| 4,987,541 | 1/1991 | Levente et al. | 364/424.03 |
| 4,989,146 | 1/1991 | Imajo | 364/424.04 |
| 5,005,129 | 4/1991 | Abe et al. | 364/424.03 |
| 5,019,799 | 5/1991 | Oshiage et al. | 340/438 |
| 5,034,889 | 7/1991 | Abe | 364/424.04 |
| 5,047,944 | 9/1991 | Ishikawa et al. | 364/424.04 |
| 5,107,428 | 4/1992 | Bethencourt et al. | 364/424.04 |
| 5,111,686 | 5/1992 | Kamiya et al. | 340/438 |
| 5,227,766 | 7/1993 | Endo | 340/635 |
| 5,243,324 | 9/1993 | Bober | 340/439 |
| 5,243,852 | 9/1993 | Morita | 73/117.3 |
| 5,253,184 | 10/1993 | Kleinschnitz | 364/550 |
| 5,255,208 | 10/1993 | Thakore et al. | 364/551.01 |
| 5,276,619 | 1/1994 | Ohara et al. | 364/424.04 |
| 5,289,377 | 2/1994 | Yokote et al. | 364/424.04 |
| 5,297,047 | 3/1994 | Matsuno | 364/431.06 |
| 5,305,214 | 4/1994 | Komatsu | 364/424.04 |
| 5,305,216 | 4/1994 | Okura et al. | 364/424.04 |
| 5,305,219 | 4/1994 | Ishibashi et al. | 364/424.04 |

FOREIGN PATENT DOCUMENTS

| | | |
|---|---|---|
| 60-243567 | 12/1985 | Japan . |
| 62-142849 | 6/1987 | Japan . |
| 63-159623 | 7/1988 | Japan . |
| 392564 | 4/1991 | Japan . |

OTHER PUBLICATIONS

Hournal of Nippondenso Technical Disclosure, No. 13-072.

*Primary Examiner*—Gary Chin
*Assistant Examiner*—Tyrone V. Walker
*Attorney, Agent, or Firm*—Cushman, darby & Cushman IP Group of Pillsbury Madison & Sutro LLP

[57] ABSTRACT

A self-diagnosis apparatus for vehicle capable of storing sufficient data useful for abnormality diagnosis includes a control unit having a CPU and RAM which can hold its stored contents even at the time of cut-off of an ignition key. The CPU receives diagnosis data necessary for analysis of the abnormality of an equipment at each predetermined period and judges whether or not the value of the diagnosis data exists in a predetermined region, in order to count up a counter of a predetermined storage region beforehand provided in the RAM corresponding to the judged region. The counting-up is stopped when the abnormality of an equipment is detected. In contrast with a method in which the value of diagnosis data is stored into the RAM as it is, the range of change of a lot of diagnosis data until the generation of abnormality can be stored with a small memory size.

12 Claims, 14 Drawing Sheets

SELF-DIAGNOSIS APPARATUS FOR VEHICLE

BACKGROUND OF THE INVENTION

The present invention relates to a self-diagnosis apparatus for vehicle which stores and holds diagnosis data necessary for analysis of abnormality of equipment mounted on the vehicle.

Recently, the electronization of a vehicle is remarkable so that equipment mounted on various parts of a vehicle inclusive of an engine are organically coupled with each other by a control computer to perform complicated operations.

In many cases, even if the abnormality of the operation of a certain single equipment is detected, a true cause for abnormality is not ascertained for a relation with the other equipment unless data indicative of a vehicle condition at that time (or diagnosis data) is collected in a wide range. Also, a temporary abnormality in operation may be followed by a natural recovery from the abnormality. In many cases, this is a precursory phenomenon of a perfect failure. However, it is very difficult to find out a cause for temporary abnormality by a check after the alighting from the vehicle.

JP-A-62-142849 and JP-A-63-159623 have proposed a self-diagnosis apparatus in which diagnosis data of various parts of a vehicle is stored into a in an updated form at every fixed period and the updating of the contents of the memory after the detection of an abnormality of an equipment mounted on the vehicle is inhibited (or frozen), thereby making it possible to accurately grasp a cause for the abnormality after the alighting from the vehicle. The memory holds its stored contents even at the time of cut-off of an ignition switch.

Also, JP-A-3-92564 has proposed an apparatus in which a control program as well as diagnosis data as mentioned above are stored in a memory, thereby making an attempt to grasp a cause for abnormality more accurately.

SUMMARY OF THE INVENTION

In order to accurately diagnose a cause for abnormality, it is required that diagnosis data is collected as much as possible until the generation of an abnormality. However, since there is a limit to a memory area, an ingenious contrivance is expected.

An object of the present invention is to provide apparatus to store data useful for abnormality diagnosis with a compact memory size.

Another object of the present invention is to provide a self-diagnosis apparatus in which the history of a vehicle condition until before the generation of an abnormality is stored as data useful for abnormality diagnosis with a compact memory size.

According to one aspect of the present invention, a self-diagnosis apparatus for a vehicle is provided, which is adapted for detecting an abnormality of an equipment mounted on a vehicle, storing a vehicle condition at the time of generation of the abnormality and outputting this vehicle condition, and which apparatus comprises vehicle condition detecting means for detecting a vehicle condition necessary for analyzing an abnormality of an equipment mounted on the vehicle;

storing means including a plurality of storage blocks which stores and holds its contents even at the time of cut-off of an ignition switch which is connected to a battery mounted on the vehicle, each of said storage blocks corresponding to a trip which indicates a predetermined period of time, information of the present trip and the previous trips being stored in such a manner that information indicative of a time for which said vehicle condition exists in a predetermined area is stored in each storage block;

abnormality detecting means for detecting the abnormality of an equipment mounted on the vehicle; and fixing means for fixing information stored in said storing means when the abnormality of an equipment mounted on the vehicle is detected by said abnormality detecting means.

According to an above aspect of the present invention, information indicative of a vehicle condition is stored at every predetermined period, thereby storing a history of the vehicle condition before an abnormality is generated. Therefore, the analysis and investigation of a cause for abnormality after the generation of the abnormality are facilitated by knowing a change in vehicle condition for each predetermined period before the generation of the abnormality. Also, since the vehicle condition in the predetermined period is stored as information indicative of a time for which the vehicle condition exists in a predetermined area, the storage of a level of the vehicle condition and a duration time of that level and the provision of sufficient data for diagnosis after the generation of the abnormality become possible with a compact memory size.

The range of change in vehicle condition may be divided into a plurality of areas so that time information is stored for each area. With such a construction, a distribution of vehicle conditions during the predetermined period can be stored to provide data further useful for diagnosis after the generation of the abnormality with a compact memory size.

Time information indicating that the vehicle condition exists in the predetermined area may be for each trip which corresponds to one run of the vehicle. Thereby, a change in vehicle condition for each trip can be stored to provide more useful data. One trip can be detected and set as a period of time after an ignition switch of the vehicle is operated into a turn-on position so that an engine is activated and until the ignition switch is operated into a turn-off position so that the engine is stopped.

DESCRIPTION OF THE PREFERRED EMBODIMENTS

Figure 1:
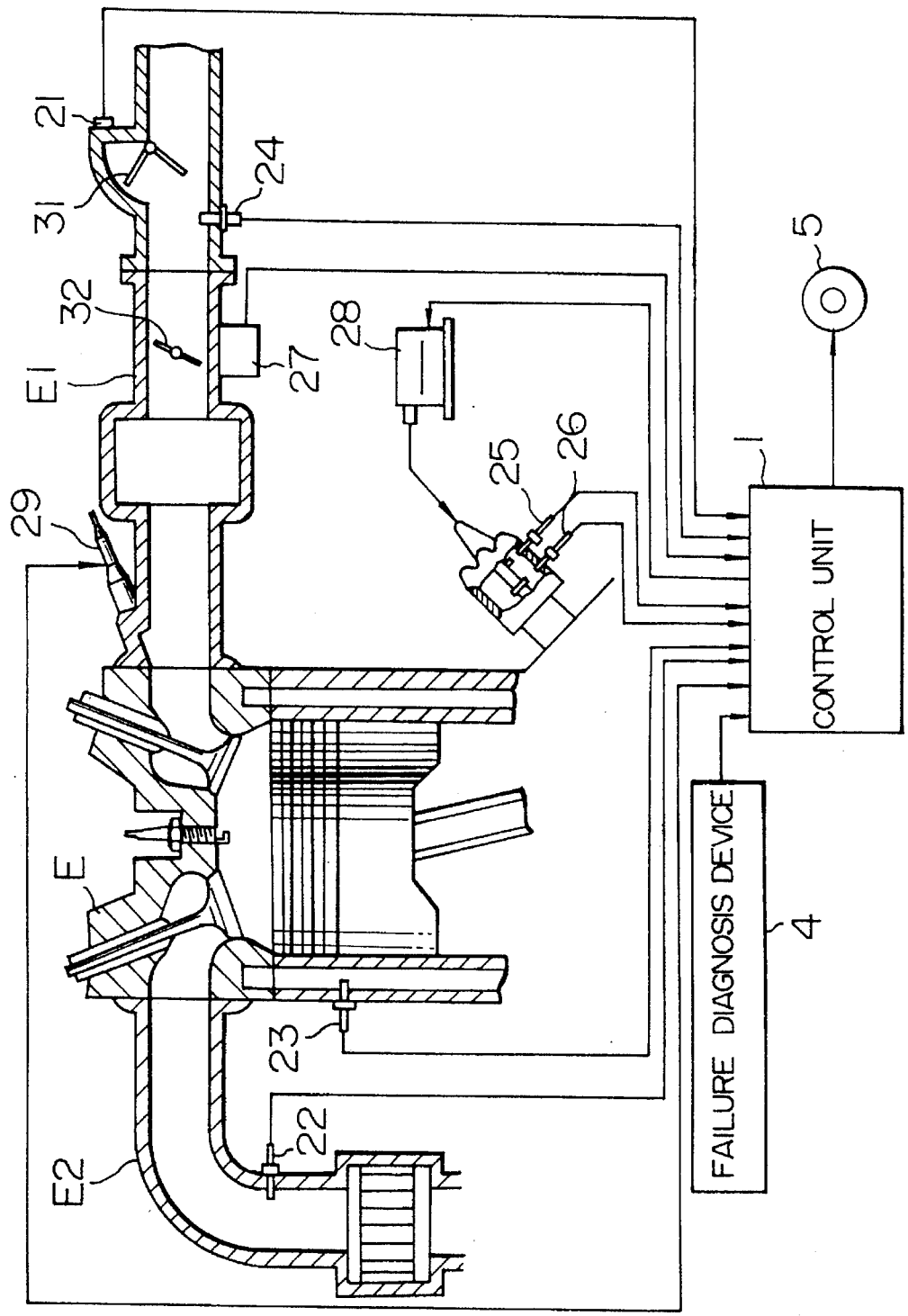
FIG. 1 is a view showing the construction of the whole of a self-diagnosis apparatus.
Figure 2:
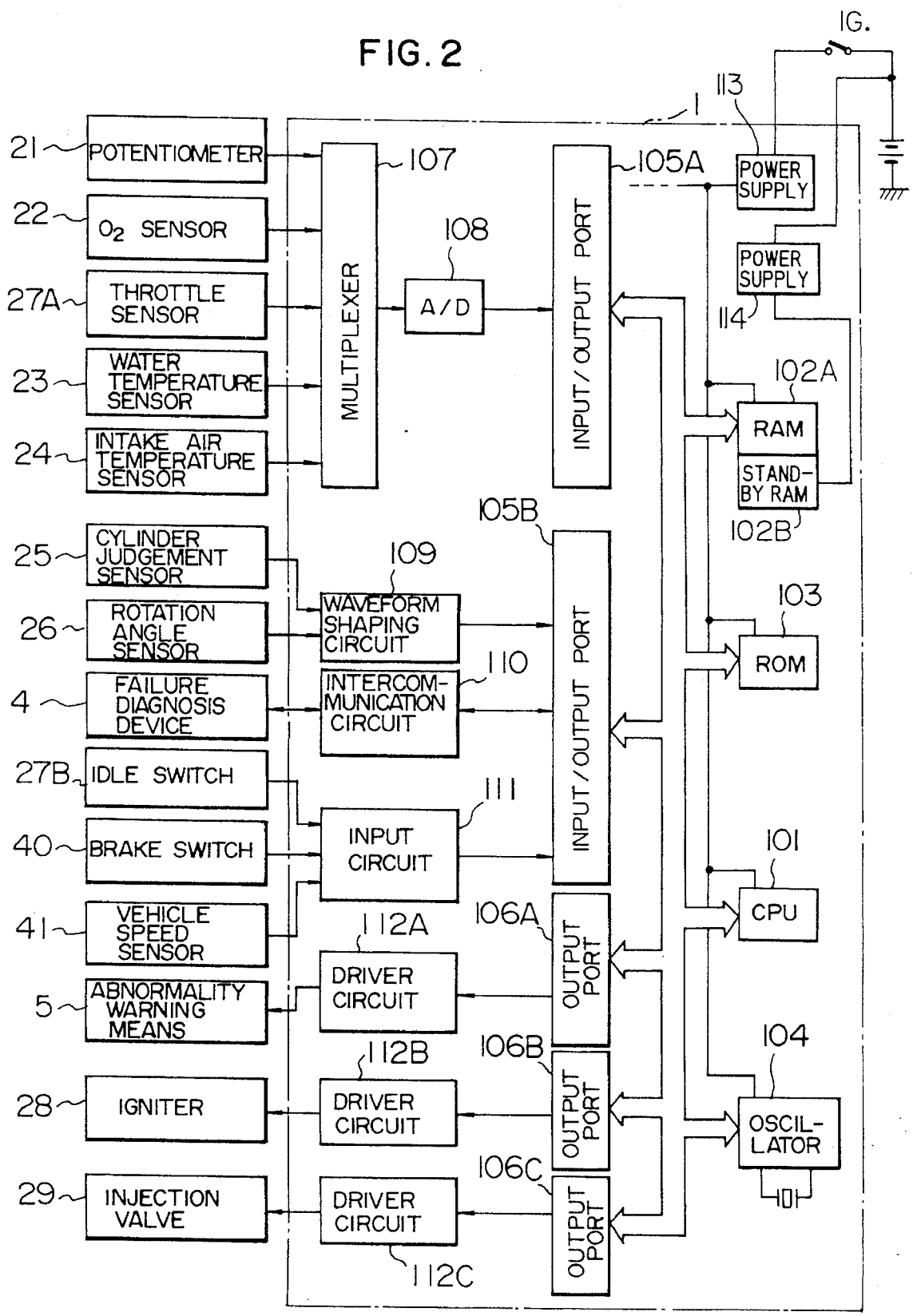
FIG. 2 is a block diagram showing the construction of a control unit.

Referring to FIGS. 1 and 2, an inlet pipe E1 of an engine E includes therein a potentiometer 21 of a flow meter 31, an inlet air temperature sensor 24, a throttle sensor 27A of a throttle valve 32, an idle switch 27B for detection of the full-opening of the throttle valve 32, and a fuel injection valve 29 in the mentioned order from an upper stream. The engine E is further provided with a water temperature sensor 23 at a water jacket and an $O_2$ sensor 22 at an exhaust pipe E2 of the engine E.

There is provided a control unit 1 which includes a CPU 101. The CPU 101 is connected through a data bus to a RAM 102, a ROM 103 for storage of a control program, an oscillator circuit 104, input/output ports 105A and 105B, and output ports 106A, 106B and 106C. The RAM 102 is partitioned into a general RAM 102A for temporary storage and a stand-by RAM 102B in which the stored contents are held even at the time of cut-off of an ignition switch IG. A power supply 113 is connected through the ignition switch IG to a battery and feeds each constituent circuit when the switch IG is made on. A power switch 114 is connected to the battery to feed stand-by RAM 102B regardless of on or off state of the switch IG, thereby making the RAM 102B hold its stored contents.

Output signals of the potentiometer 21, the $O_2$ sensor 22, a water temperature sensor 23, the inlet air temperature sensor 24 and the throttle sensor 27A are inputted to the input/output port 105A through a multiplexer 107 and an A/D converter 108. Output signals of a cylinder judgement sensor 25 and a rotation angle sensor 26 are inputted to the input/output port 105B through a waveform shaping circuit 109. Output signals of a brake switch 40, the idle switch 27B and a vehicle speed sensor 41 are inputted to the input/output port 105B through an input circuit 111.

Output signals are supplied to an igniter 28 through the output port 106B and a driver circuit 112B and to the fuel injection valve 29 through the output port 106C and driver circuit 112C, respectively.

When an abnormality in the above-mentioned equipment mounted on a vehicle is detected, an output signal is issued to abnormality warning means 5 through the output port 106A and a driver circuit 112A. Also, diagnosis data necessary for analysis of the abnormality of an equipment is communicated between a failure diagnosis device 4 and the input/output port 105B through an intercommunication circuit 110, as will be mentioned later.

Figure 3:
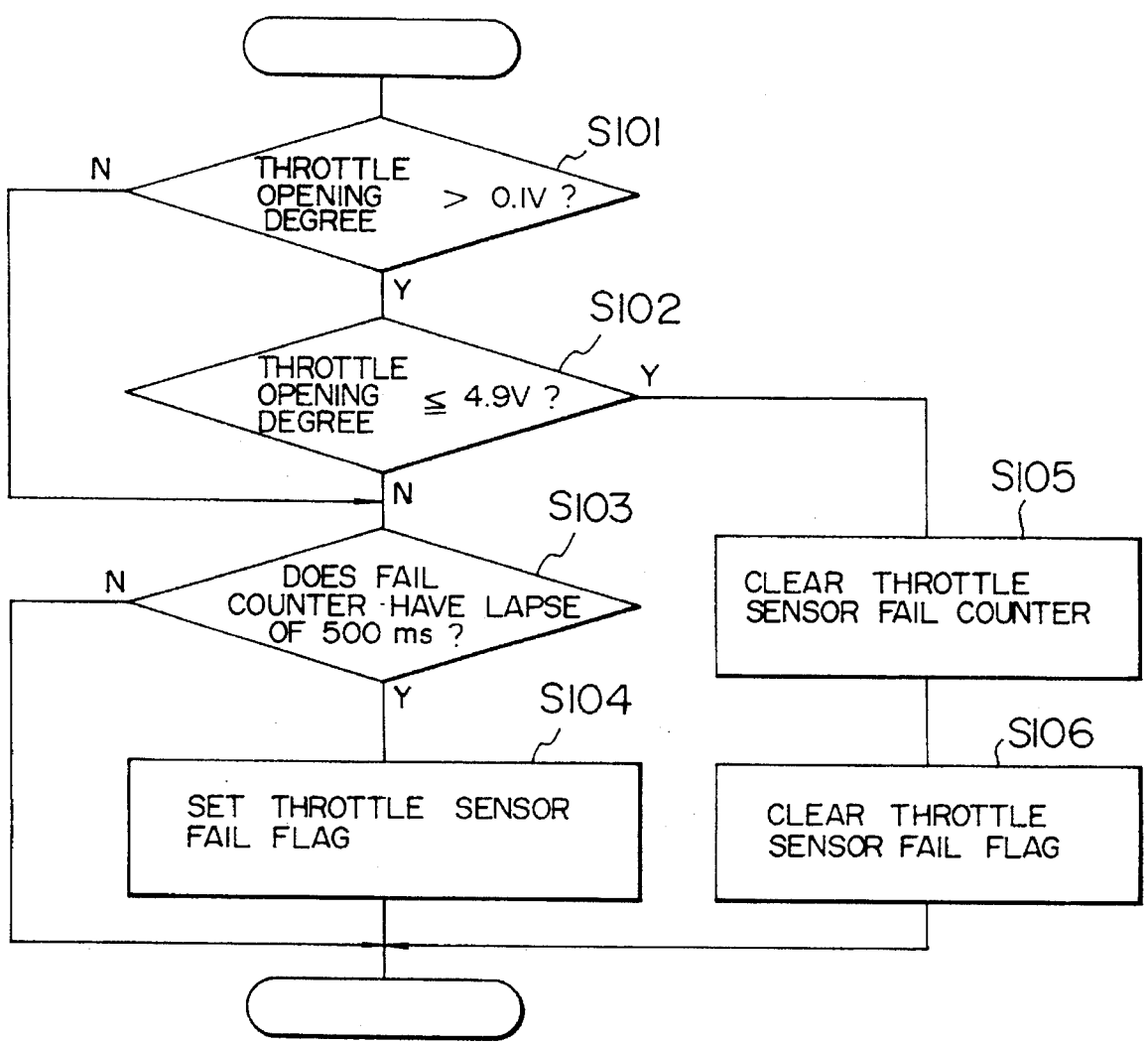
FIGS. 3 and 4 show program flow charts.

FIG. 3 shows as one example a program for detecting an abnormality of the throttle sensor 27A. In steps S101 and S102, the judgement is made as to whether or not a throttle opening signal (or a signal indicating the degree of opening of the throttle valve) falls within a predetermined range between 0.1 V and 4.9 V. If the throttle opening signal falls within the predetermined range, a fail counter is cleared and a fail flag in the general RAM is cleared (steps S105 and S106). On the other hand, if a time for which the throttle opening signal does not fall within the predetermined range exceeds 500 ms (step S103), the fail flag is set as an abnormality of the throttle sensor (step S104).

Figure 4:
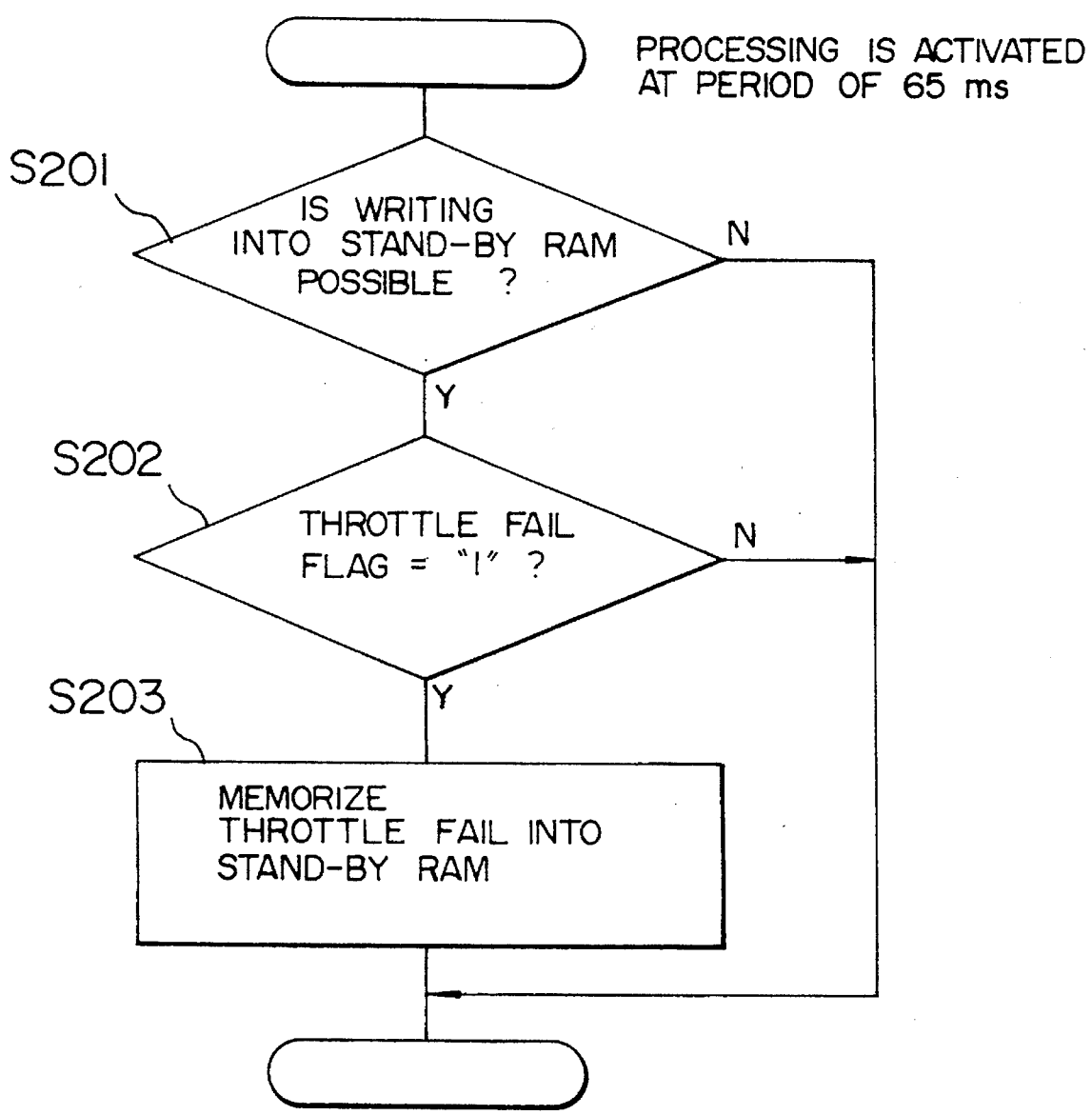

FIG. 4 shows a program for setting the stand-by RAM when the fail flag is set. This program is activated at a period of 65 ms. In step S201, the confirmation is made as to whether or not writing into the stand-by memory is possible. In the case where the fail flag is set, a predetermined bit of the stand-by RAM is set (steps S202 and S203), thereby memorizing the detection of an abnormality of a specified equipment.

Figure 5:
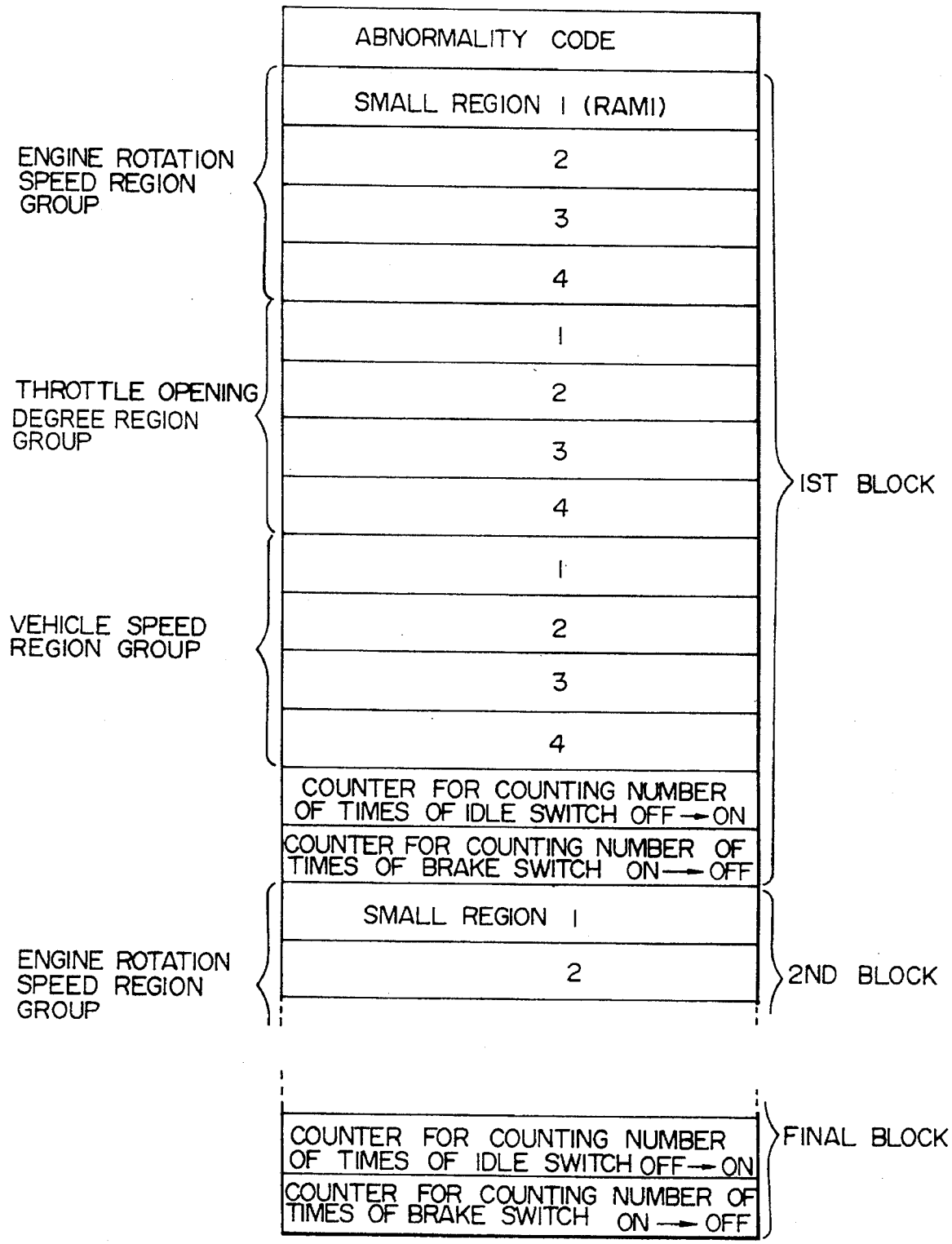
FIG. 5 is a diagram showing the memory construction of a stand-by RAM.

A memory construction of the stand-by RAM is shown in FIG. 5. A storage area of the RAM is divided into a plurality of blocks each of which stores data for one trip from the turn-on of the ignition switch to the cut-off thereof. Each block is composed of respective counter region groups for engine rotation speed, throttle opening degree, vehicle speed, idle switch and brake switch which form diagnosis data. Each of the engine rotation speed, throttle opening degree and vehicle speed counter region groups is further divided four small counter regions (regions 1 to 4) each of which is counted up in accordance with a range where the value of the diagnosis data exists, as will be mentioned later on. An abnormality code indicating the kind of abnormality is set at a leading address.

In the present invention, diagnosis data is thus stored distinguishably for each trip. Therefore, a cause for failure can be investigated by reading the diagnosis data for each trip and comparing a difference in diagnosis data between trips. For example, in the case where an engine was operated in a low rotation speed region for a long time in a trip in which data was frozen because of the generation of an abnormality whereas the engine was operated in a high rotation speed region for a long time in the preceding trip, it is possible to conjecture such a difference in engine rotation speed as a cause for generation of the abnormality and it is therefore possible to investigate the cause for abnormality with the engine rotation speed being taken as a clue.

Figure 6:
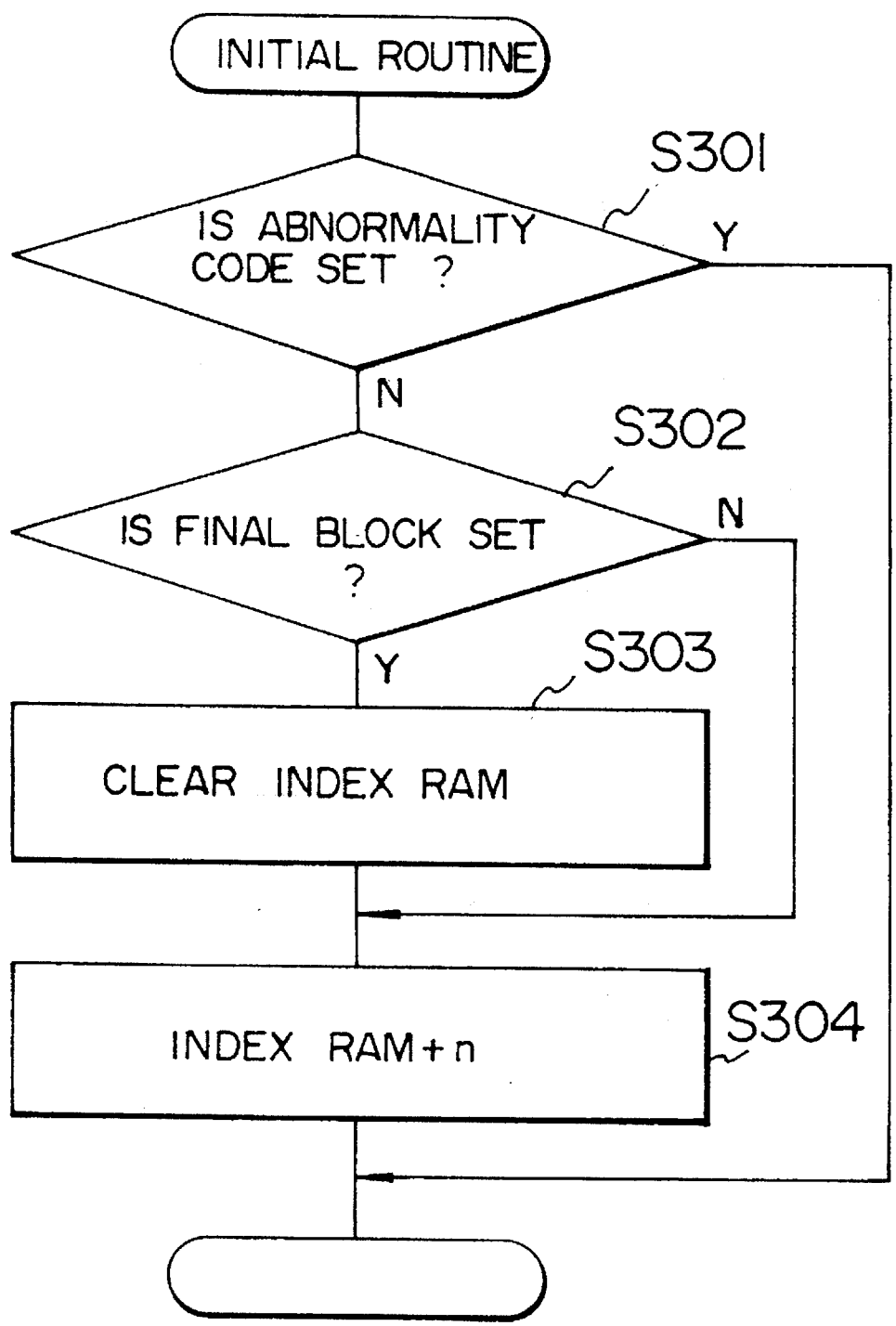
FIGS. 6 to 11 shows program flow charts.
Figure 7:
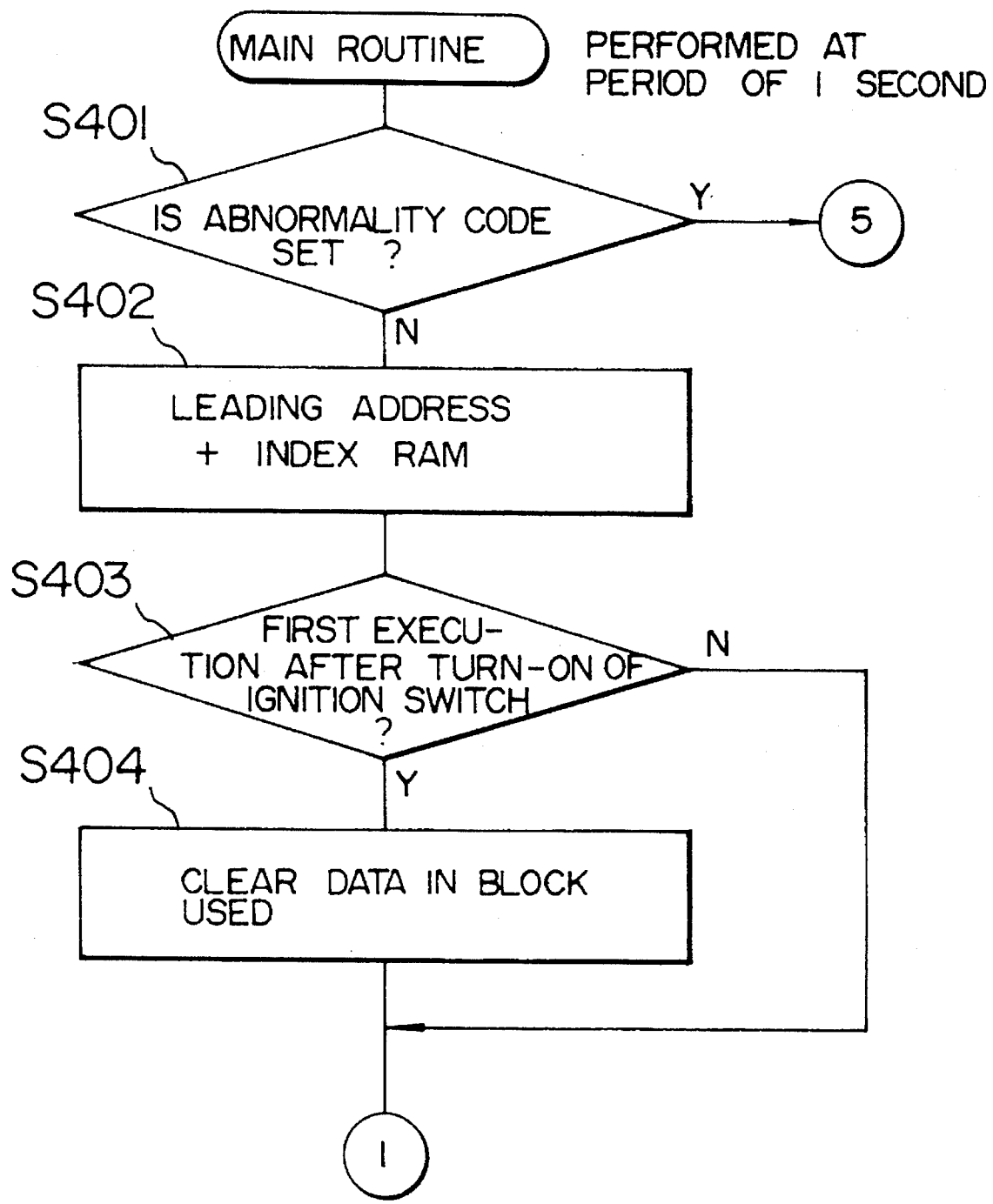

FIG. 6 shows an initial routine performed only at the time of turn-on of the ignition switch. In this routine, an index RAM necessary for determining a leading address of a block in the stand-by RAM used in a corresponding trip is set. In step S301, it is confirmed that an abnormality code is not set. Subsequently, the judgement is made as to whether or not the final block is used (step S302). In the case where the final block is used, the index RAM is cleared (step S303). In the case where the final block is not used, n is added to the index RAM (step S304), where n represents the number of small counter regions included in each block and is 14 in the present embodiment.

FIGS. 7 to 11 show a main routine performed at a period of 1 second. If it is confirmed in step S401 of FIG. 7 that an abnormality code is not set, the content of the index RAM is added to a leading address to determine a leading address of a block in the stand-by RAM used in a corresponding block (step S402). In the case where the execution is the first one after the ignition switch has been turned on, data in the block used is cleared (steps S403 and S404). In the case where the abnormality code is not set (step S401), the processing is completed.

Figure 8:
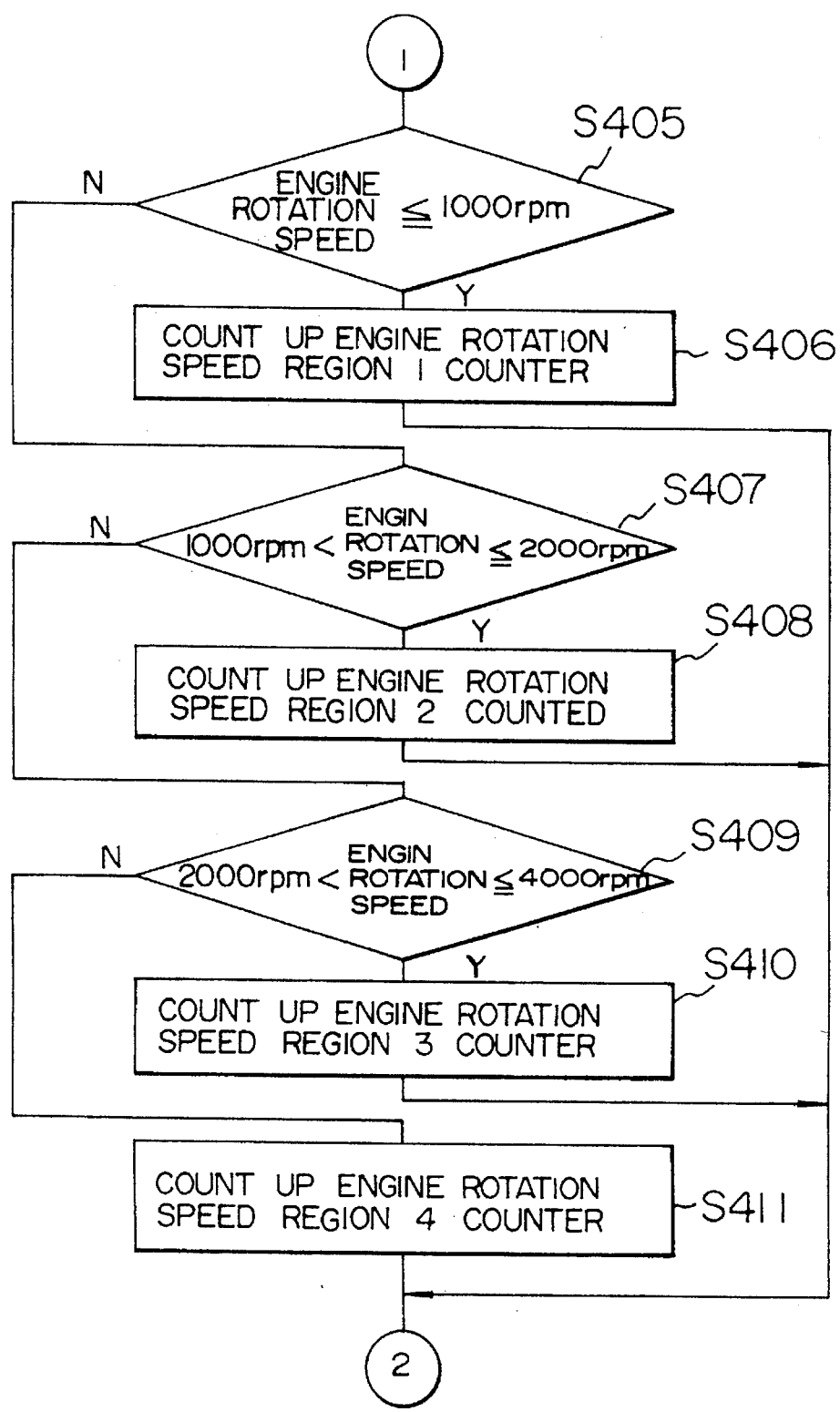

Steps S405 to S411 of FIG. 8 show a procedure for counting up small counter regions in the block in accordance with an engine rotation speed. More especially, when the engine rotation speed is equal to or smaller than 1000 rpm, a counter of the engine rotation counter region 1 is counted up (steps S405 and S406). When the engine rotation speed is larger than 1000 rpm and equal to or smaller than 2000 rpm, a counter of the region 2 is counted up (steps S407 and S408). When the engine rotation speed is larger than 2000 rpm and equal to or smaller than 4000 rpm, a counter of the region 3 is counted up (steps S409 and S410). When the engine rotation speed is larger than 4000 rpm, a counter of the region 4 is counted up (step S411).

Figure 12:
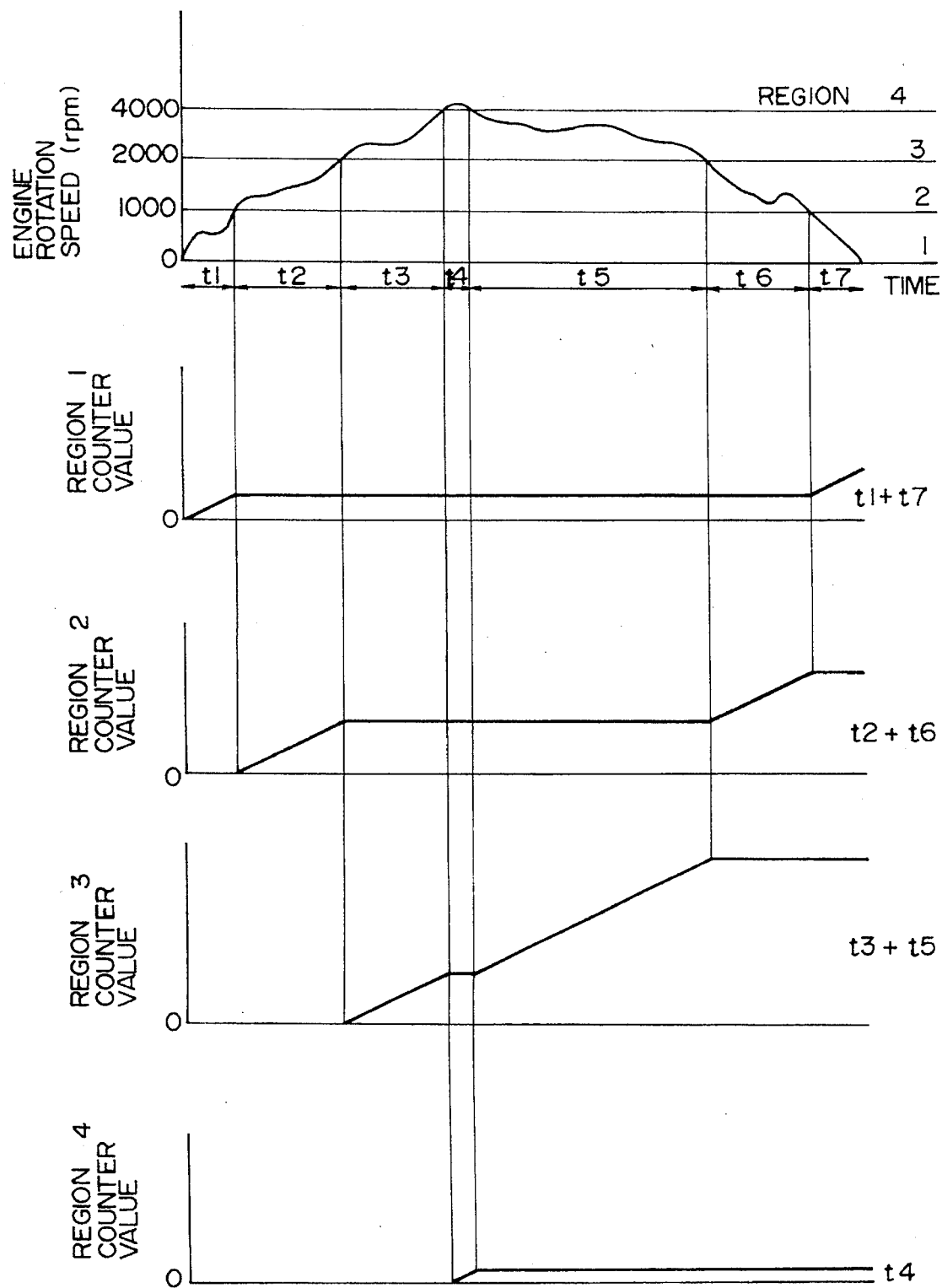
FIGS. 12 to 14 show time charts of various signals.

For example, when the engine rotation speed changes as shown in FIG. 12, the region 1 counter is counted up in times t1 and t7, the region 2 counter in times t2 and t6, the region 3 counter in times t3 and t5, and the region 4 counter in a time t4, so that the values of those counters change as shown in FIG. 12.

Figure 9:
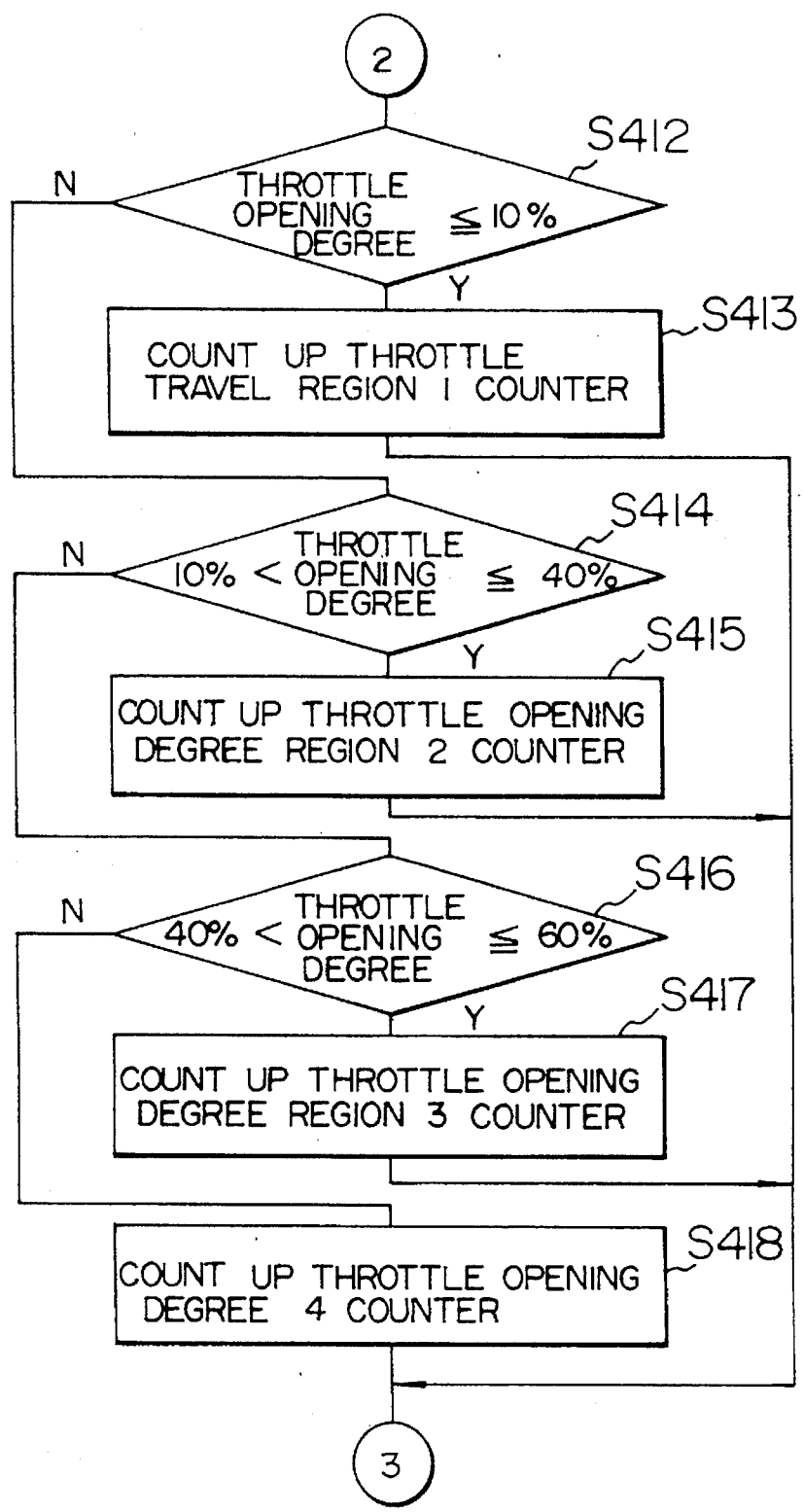
Figure 13:
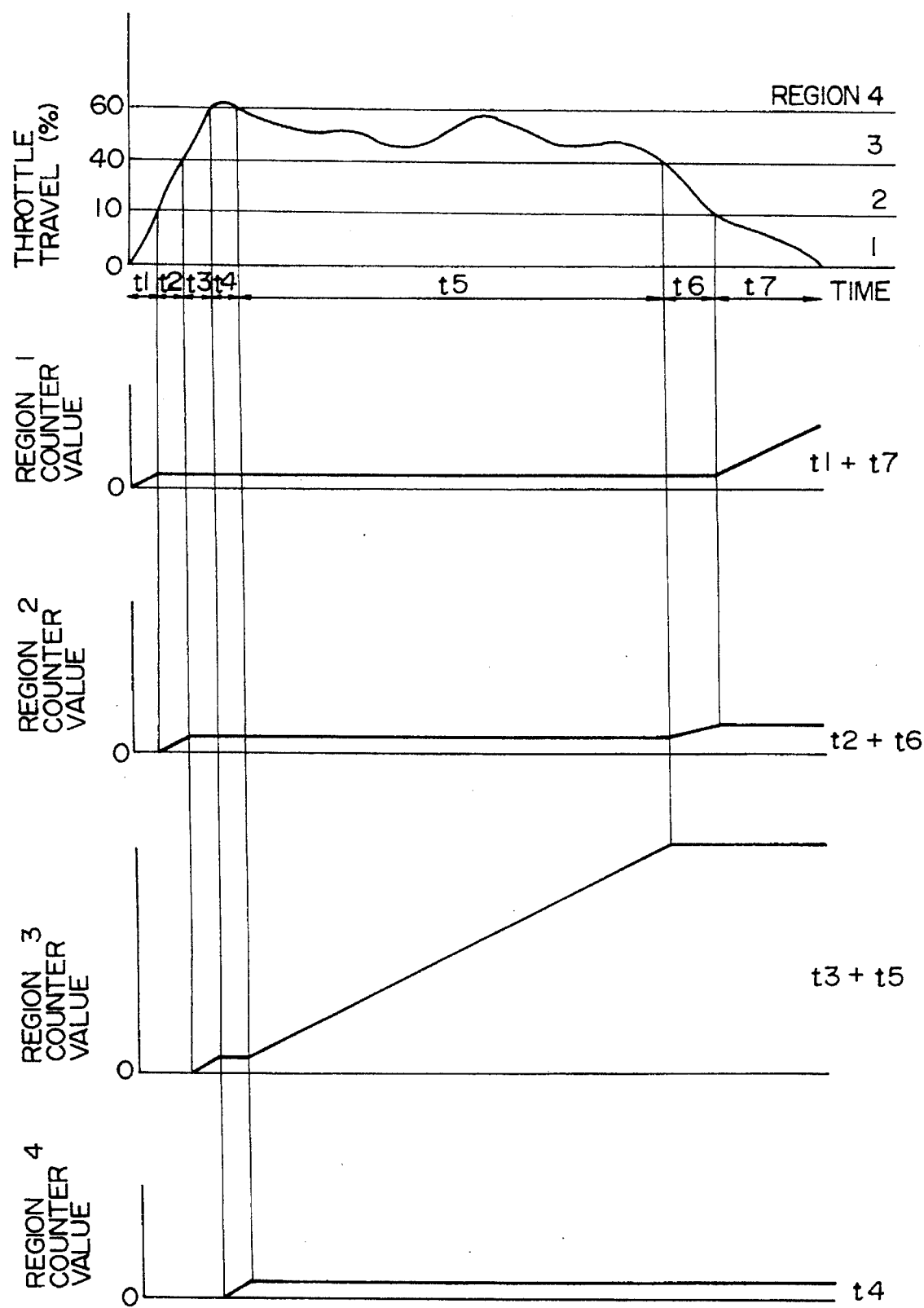

Steps S412 to S418 of FIG. 9 show a procedure for counting up counter regions in accordance with a throttle opening degree. Region 1 to 4 counters are counted up in accordance with a range of throttle opening degrees equal to or smaller than 10%, a range of throttle opening degrees larger than 10% and equal to or smaller than 40%, a range of throttle opening degrees larger than 40% and equal to or smaller than 60% and a range of throttle opening degrees larger than 60%, respectively. As a result, the values of those counters change in accordance with the change in throttle opening degree, as shown in FIG. 13.

Figure 10:
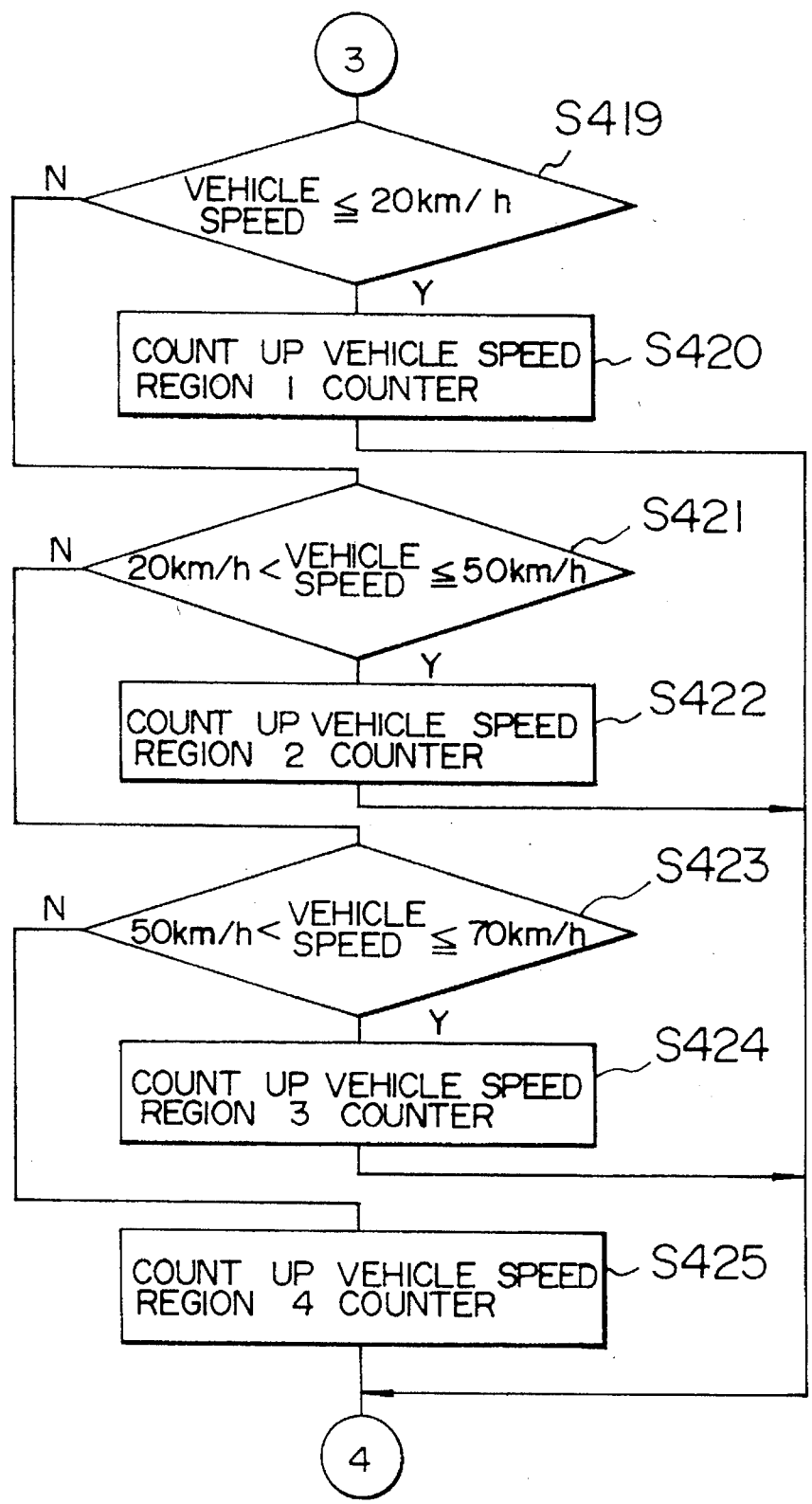
Figure 14:
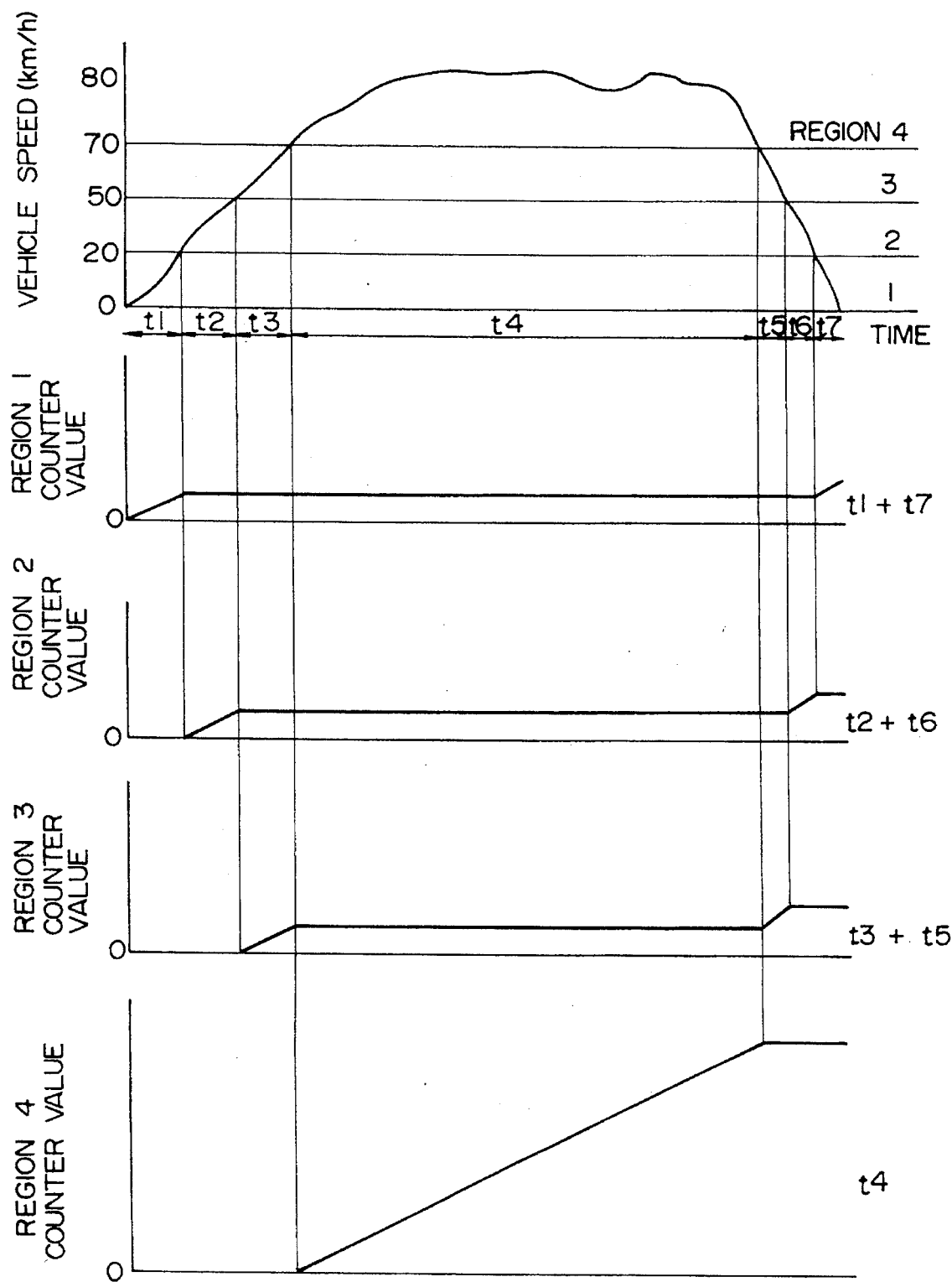

Steps S419 to S425 of FIG. 10 show a procedure for counting up counter regions in accordance with a vehicle speed. Region 1 to 4 counters are counted up in accordance with a range of vehicle speeds equal to or smaller than 20 Km/h, a range of vehicle speeds larger than 20 Km/h and equal to or smaller than 50 km/h, a range of vehicle speeds larger than 50 Km/h and equal to or smaller than 70 Km/h and a range of vehicle speeds larger than 70 Km/h, respectively. As a result, the values of those counters change in accordance with the change in vehicle speed, as shown in FIG. 14.

Figure 11:
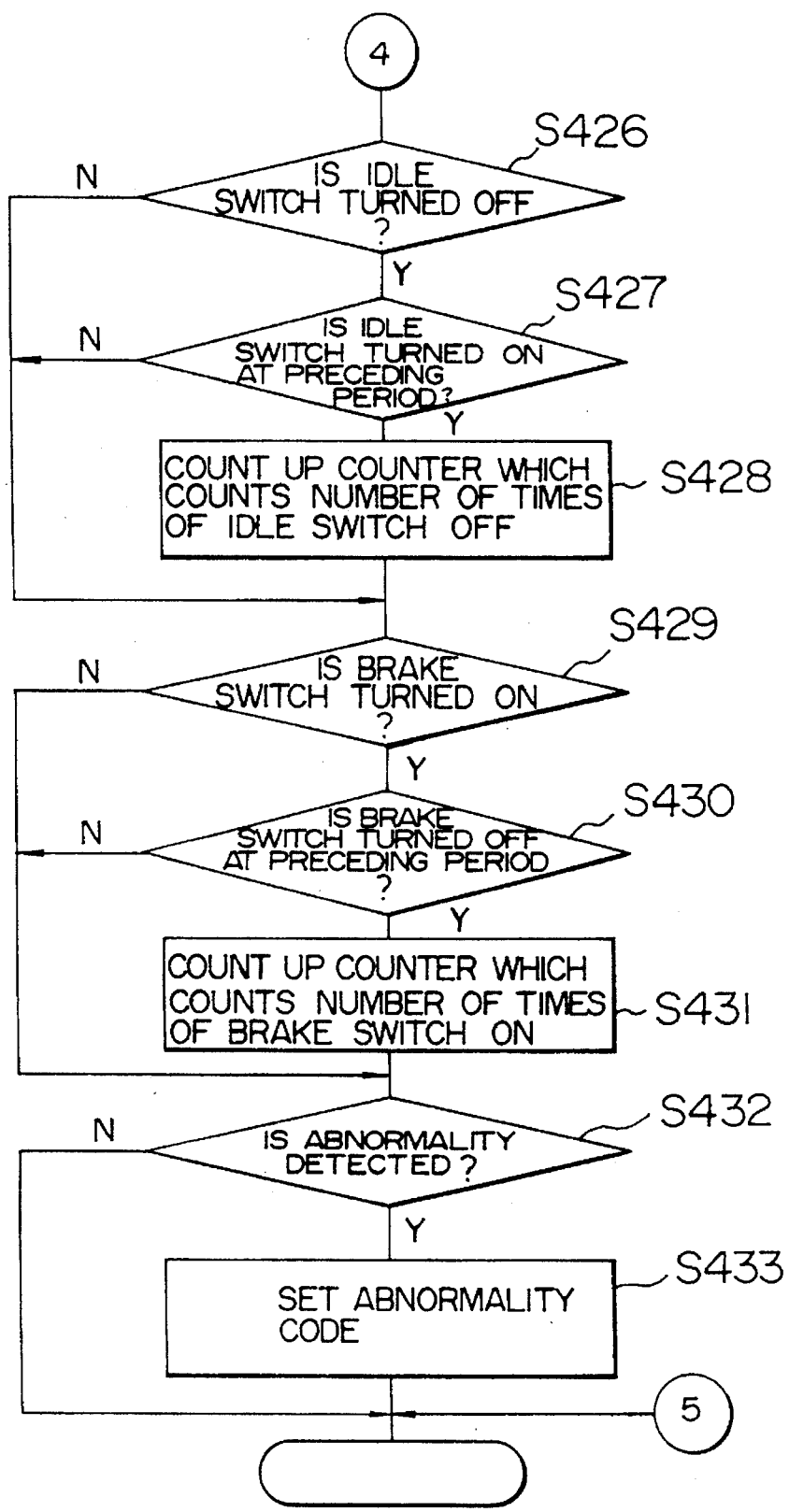

In steps S426 to S428 of FIG. 11, the number of times of turn-off of the idle switch is counted. In steps S429 to S431, the number of times of turn-on of the brake switch is counted. In step S432, the judgement is made as to whether or not a predetermined bit of the stand-by RAM is set for memorizing the detection of an abnormality of a specified equipment. In the case where there is the detection of the abnormality, an abnormality code is set, thereby inhibiting or freezing the updating of data to provide a frozen condition.

In this manner, the range of change of each diagnosis data until the detection of abnormality is clarified with a sufficient time width. Therefore, it is possible to surely analyze a cause for generation of an abnormality and to reduce a required memory capacity.

In the foregoing embodiment, a plurality of blocks is secured in the stand-by RAM in order to reserve data in a plurality of trips. Alternatively, a single block may be provided in such a manner that it is used again for each trip.

The processing of the foregoing embodiment for storage of diagnosis data over several trips before the generation of an abnormality can be combined with the conventional processing in which the values of diagnosis data immediately before the generation of the abnormality or until the time of generation of the abnormality are frozen (though the detailed explanation of such a conventional processing is omitted since it is disclosed by JP-A-62-142849 and JP-A-63-159623). According to this combination, a cause for generation of an abnormality can be analyzed more surely.

We claim:

1. A self-diagnosis apparatus for a vehicle for detecting and storing data of vehicle conditions, detecting a possible abnormality of equipment mounted on the vehicle, and for outputting stored data for diagnosis of the possible abnormality, said apparatus comprising:

a plurality of sensors each for detecting and outputting, during operation of equipment mounted on the vehicle, a value of a respective ones of predetermined parameters representative of vehicle operating conditions;

means for dividing a predetermined region of output values of each of said sensors into a plurality of subregions;

means for determining into which of said subregions values of each of the parameters output by the sensors fall;

memory means for storing data and for updating the stored data, said memory means including a plurality of storage regions corresponding in number to said subregions, each of said storage regions storing therein a period of time during which values of the parameters are in the subregion corresponding to the storage region, as determined by said determining means;

abnormality detecting means for detecting an abnormality of equipment; and fixing means for causing said memory means to fixedly store data of said memory means when an abnormality is detected by said abnormality detecting means.

2. A self-diagnosis apparatus for a vehicle according to claim 1 wherein said condition detection means includes a plurality of sensors.

3. A self-diagnosis apparatus for a vehicle according to claim 1, wherein said memory means includes an abnormality storage region for storing the presence/absence of generation of an abnormality, and said fixing means includes setting means for storing the generation of an abnormality into said abnormality storage region when an abnormality is detected by said abnormality detecting means and inhibiting means for inhibiting the storage of said information into said memory means by judging whether the generation of an abnormality is stored in said abnormality storage region.

4. An apparatus according to claim 1, wherein said memory means comprises back-up RAMs.

5. An apparatus according to claim 1, wherein said each storage region stores the data of the length of time by additively storing data of the number of times values of the parameter fall within the corresponding subregion.

6. An apparatus according to claim 1, further including means for determining a trip period of the vehicle, wherein said memory means comprises a plurality of storage blocks each comprising said plurality of storage regions and storing data of time in current and past trip periods respectively.

7. A self-diagnosis apparatus for a vehicle according to claim 6, wherein said trip corresponds to one running period of the vehicle.

8. A self-diagnosis apparatus for a vehicle according to claim 7, wherein said trip corresponds to a period of time from the operation of an ignition switch of the vehicle into a turn-on position to the operation thereof into a turn-off position.

9. A self-diagnosis apparatus for a vehicle for detecting a possible abnormality of at least one equipment mounted on the vehicle, storing a vehicle condition at the time of generation of the possible abnormality and outputting the vehicle condition, said apparatus comprising:

vehicle condition detecting means for detecting, during operation of equipment mounted on the vehicle, a vehicle condition necessary for analyzing an abnormality of said equipment;

means for determining time duration periods during which said condition detecting means detects vehicle operation conditions to be in each of a plurality of predetermined operation regions in order to produce respective time information of said determined periods;

storage means including storage regions corresponding to said operation regions, each for storing therein a cumulative value of the respective time information, said storage means, connected to a battery mounted on the vehicle, being capable of holding the stored information in an off state of an ignition switch;

abnormality detecting means for detecting the abnormality of equipment mounted on the vehicle; and fixing means for fixing information stored in said storing means when an abnormality of the equipment mounted on the vehicle is detected by said abnormality detecting means.

10. A self-diagnosis apparatus for a vehicle for detecting and storing data of vehicle conditions, detecting a possible abnormality of equipment mounted on the vehicle, and for outputting stored data for diagnosis of the possible abnormality, said apparatus comprising:

detection means for detecting, over a plurality of time periods during operation of equipment mounted on the vehicle, a value of at least one parameter representative of a vehicle condition necessary for diagnosis of an abnormality of said equipment;

means for dividing a predetermined region of values of the at least one parameter into a plurality of subregions;

measuring means for determining, during each of said time periods, a one of said plurality of subregions corresponding to the value of said parameter as detected by said detection means;

memory means for storing data and for updating the stored data, said memory means including a plurality of storage regions corresponding in number to said subregions, each of said storage regions storing therein a cumulative value of the number of time periods during which the value of the parameter is in the subregion corresponding to the storage region, as determined by said measuring means;

abnormality detecting means for detecting an abnormality of equipment; and fixing means for causing said memory means to fixedly store data of said memory means when an abnormality is detected by said abnormality detecting means, wherein said measuring means includes means for counting time periods during which said detection means detects a value of the parameter in the respective subregions.

11. A self-diagnosis apparatus for a vehicle for detecting and storing data of vehicle conditions, detecting a possible abnormality of equipment mounted on the vehicle, and for outputting stored data for diagnosis of the possible abnormality, said apparatus comprising:

a plurality of sensors each for detecting and outputting, during operation of equipment mounted on the vehicle, a value of a respective ones of predetermined parameters representative of vehicle operating conditions, said predetermined parameters including at least one of engine rotation speed, vehicle speed and throttle opening degree;

means for dividing a predetermined region of output values of each of said sensors into a plurality of subregions;

means for determining into which of said subregions values of the parameter of each said sensor fall;

memory means for storing data and for updating the stored data, said memory means including a plurality of storage regions corresponding in number to said subregions, each of said storage regions storing therein a period of time during which values of the parameters are in the subregion corresponding to the storage region, as determined by said determining means;

abnormality detecting means for detecting an abnormality of equipment; and fixing means for causing said memory means to fixedly store data of said memory means when an abnormality is detected by said abnormality detecting means.

12. A self-diagnosis apparatus for a vehicle for detecting and storing data of vehicle conditions, detecting an abnormality of equipment mounted on the vehicle, and for outputting stored data for diagnosis of the detected abnormality, said apparatus comprising:

detection means for detecting, during operation of equipment mounted on the vehicle, a value of at least one parameter representative of a vehicle condition necessary for diagnosis of an abnormality of said equipment;

means for dividing a predetermined region of values of the at least one parameter into a plurality of subregions;

means for determining into which of said subregions values of the parameter fall within;

memory means for storing data and for updating the stored data for each trip of said vehicle, said memory means including a plurality of storage regions corresponding in number to said subregions, each of said storage regions storing therein on a real time basis a length of time during which values of the parameters are in the subregion corresponding to the storage region, as determined by said determining means;

abnormality detecting means for detecting an abnormality of equipment; and fixing means for causing said memory means to fixedly store data of said memory means when an abnormality is detected by said abnormality detecting means.

* * * * *